Fig. 3

Inventors
William A. Gurney
Arthur J. Stubbs
Peter H. Hollins
By Stevens Davis Miller & Mosher
Attorneys United States Patent Office 3,168,367
Patented Feb. 2, 1965

3,168,367
MECHANICAL OSCILLATION RECORDING DEVICE
William Arthur Gurney, Castle Bromwich, Arthur James Stubbs, Solihull, and Peter Henry Hollins, Sutton Coldfield, England, assignors to Dunlop Rubber Company Limited, London County, England, a British company
Filed Dec. 1, 1961, Ser. No. 156,216
Claims priority, application Great Britain Dec. 20, 1960
1 Claim. (Cl. 346—7)

This invention relates to a recording device for forces resulting in mechanical oscillations.

An object of the present invention is to provide a device for recording forces resulting in mechanical oscillations especially where the oscillations are of small amplitude.

According to the invention, a recording device for the force resulting in variations in the oscillatory movement of one end of a spring from a resting position comprises an electrical recording circuit energised in response to movement of the end of the spring to a predetermined position spaced from the resting position in a direction of oscillation of the spring, and recording means actuated by energisation of the recording circuit to record the part of the period of oscillation which elapses before the end of the spring reaches the predetermined position.

Usually, the electrical recording circuit includes a switch which is positioned to be opened or closed when said end of said spring is in the predetermined position. For instance, the switch can comprise a pair of contacts at least one of which acts as a stop to limit the movement of the end of the spring and which are either closed or opened by the abutting of the end of the spring. Preferably, a further circuit includes a contact which can be one of the contacts already mentioned carried on the end of the spring to abut the stop and connected to the grid of a triode valve, the anode and cathode of which are connected in the recording circuit. Alternatively, the two contacts of the switch are spaced apart to provide a pair of stops to limit the amplitude of movement of the end of the spring and the further contact can be positioned to contact either of these stops at the limits of amplitude.

The recording means can comprise an electrically-conductive support for electro-sensitive paper, an electrically-conductive stylus mounted for oscillation in response to the spring, and means for moving the paper transversely of the directions of movement of the stylus, the support and the stylus being connected in the recording circuit.

The movement of the spring can be controlled, if desired, by a beam member to which the spring is attached to oscillate the beam member through a predetermined amplitude and thereby oscillate the end of the spring through a predetermined amplitude. The switch can be positioned to be opened or closed when the beam member is in the predetermined position, and when the switch comprises a pair of contacts, at least one of the contacts can act as a stop to limit the movement of the beam member. The further circuit can be carried on the beam member to abut the stop and can be, as already indicated, connected to the grid of a triode valve. In use, the stop limits movement of the beam member and also causes the stylus to record a line on the paper, either when the beam member is clear of the stop and the further circuit is open, or when the further circuit is closed by the beam member abutting stop. Usually, two stops are provided so that the oscillation of the beam member is limited in both directions and closing of the further circuit is arranged to open the stylus circuit so that a line is recorded only when the beam member is between the stops.

The recording device is particularly suitable for use with the cure tester described in our copending application No. 156,384, filed Dec. 1, 1961, in which the stylus is oscillated by an eccentric which oscillates the beam member and an inextensible strip positioned to be sandwiched by a sample of rubber composition to be tested through yieldable connecting means such as a spring. The beam member is preferably mounted with the stops adjacent one end with the strip secured substantially perpendicular to the beam member nearer to the pivot than the stops. The beam member and inextensible strip are urged away from the spring, for example, by a return spring.

A recording device in accordance with the invention will now be described by way of example with reference to the accompanying drawings, in which:

FIGURE 3 is a circuit diagram of the electrical recording circuit.

Figure 1:
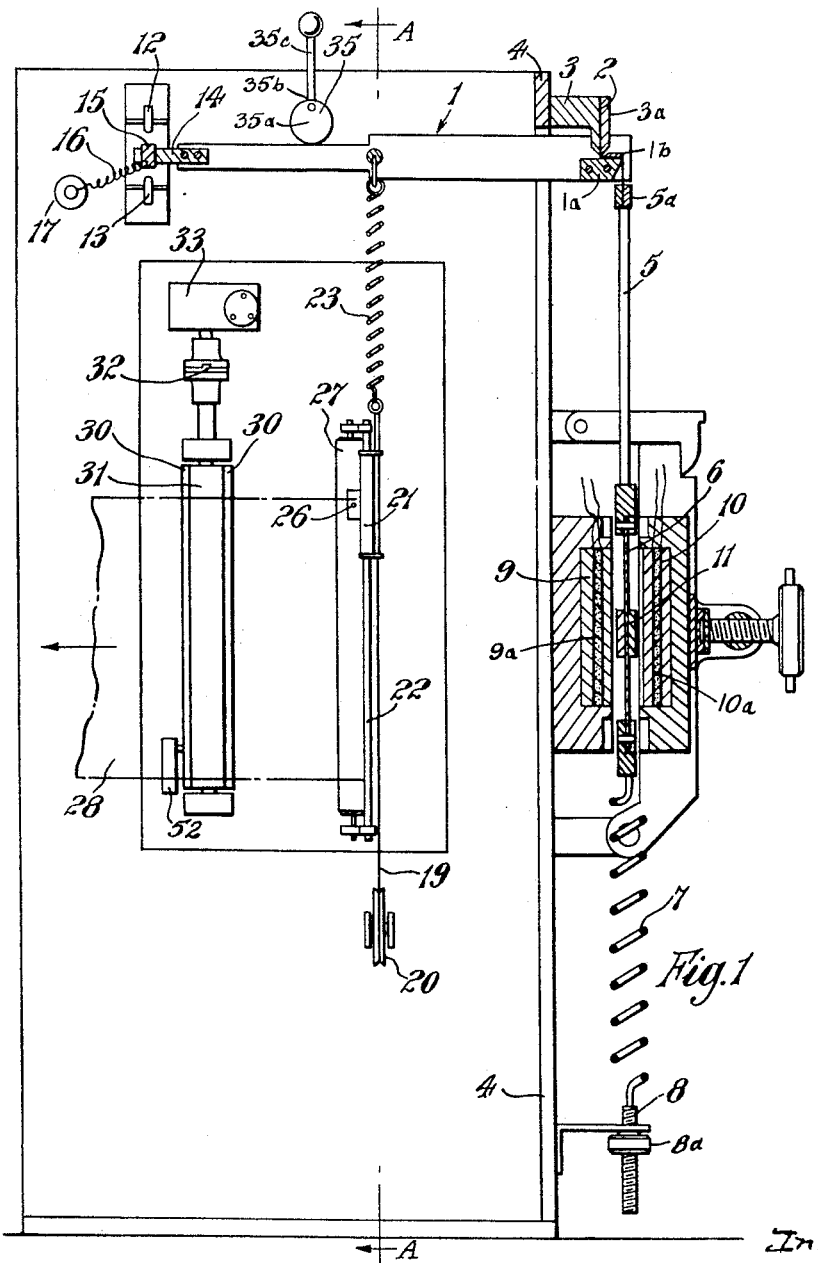
FIGURE 1 is a front elevation of a cure tester incorporating the device.
Figure 2:
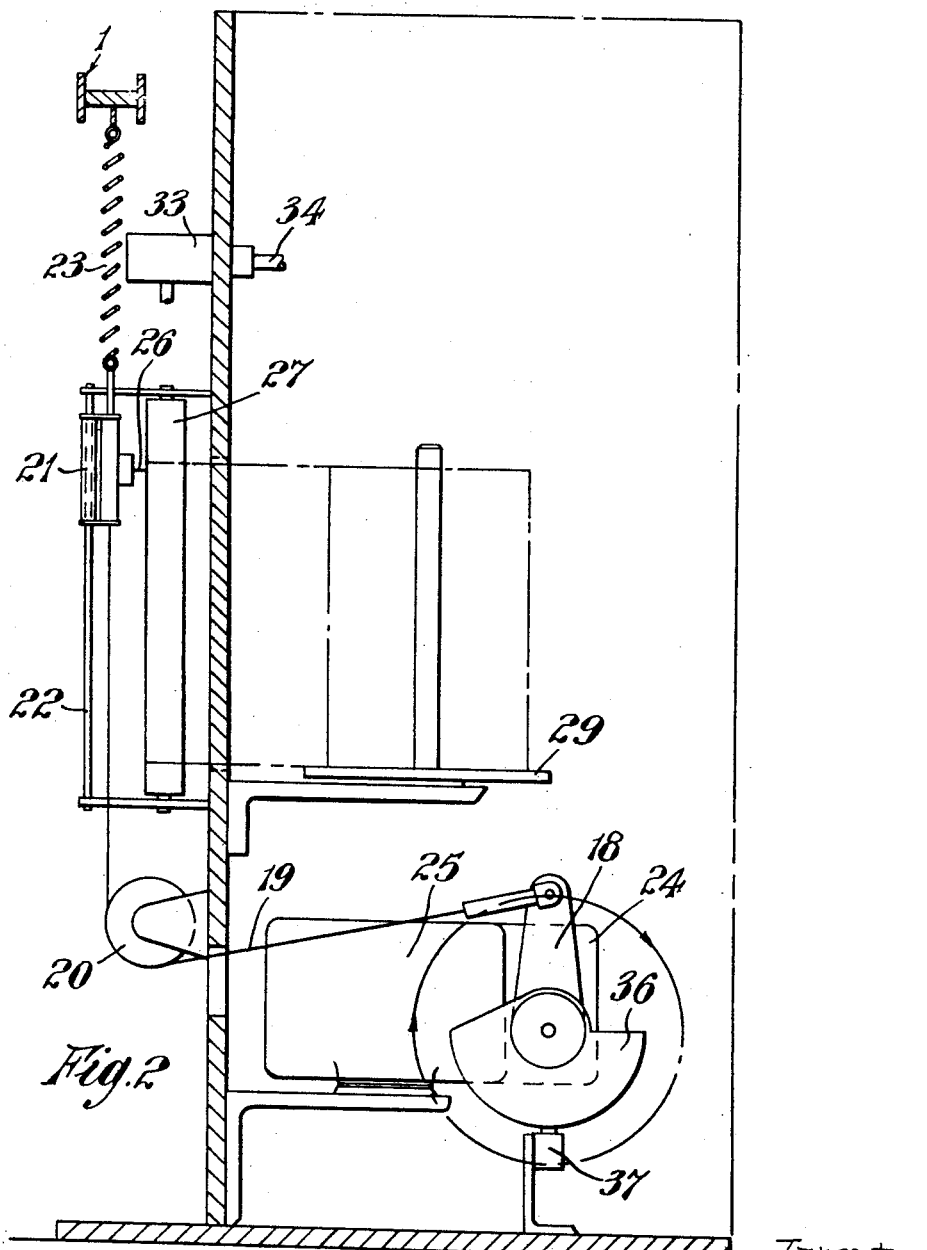
FIGURE 2 is a section along the line A—A of FIGURE 1.

As shown in FIGURE 1, the cure tester comprises a beam member 1 pivotally mounted by means of a Phosphor bronze strip 2 on a support member 3 of a framework. The Phosphor bronze strip 2 is secured to the support member 3 by means of a clamping plate 3a which is held by screws passing into the support member 3. The beam member 1 carries a block 1a and the Phosphor bronze strip 2 is secured to the upper surface of the block 1a by means of a clamping plate 1b secured to the block 1a by means of screws. The Phosphor bronze strip 2 depends from the end of the beam member 1 and is secured to one end of a link 5 by means of a clamping plate 5a. The link 5 carries at its other end an inextensible perforated strip 6. The beam member 1 is thus pivotally mounted on the support member and the link 5 is able to pivot about the end of the beam member 1. The inextensible strip 6 is also secured to one end of a spring 7 rigidly attached at its other end through adjusting means 8 to the framework 4. The adjusting means 8 is tension adjusting means for the spring 7 and rotation of the nut 8a allows the tension in the spring 7 to be varied. Clamping means comprising a pair of platens 9, 10 provided with heating means 9a and 10a are positioned one on each side of the strip to secure a sample of material to be tested, in this case a sample 11 of vulcanizable rubber to the strip.

A pair of contacts 12, 13 are positioned one on each side of the beam member 1 at the end furthest from the pivot and the beam member 1 at this end terminates in a rod 14 of electrical insulating material carrying a metal rod 15 positioned transversely of the rod 14 and adapted to contact either of the contacts 12, 13 when the beam member 1 is at its limits of amplitude. The contacts 12, 13 serve not only as electrical contacts, but as stops to limit the movement of the beam member 1 and are positioned a distance apart so that the amplitude of movement of the inextensible strip 6 is of the order of 10 thousandths of an inch. The short metal rod 15 carried by the beam member 1 is connected by means of a fine flexible wire 16 to a terminal 17.

The recording means comprises an eccentric or crank arm 18 attached to one end of a cord 19 passing around a pulley 20 so that the other end is secured to a carriage 21 slidable in a vertical direction on a rod 22. The carriage 21 is also secured to one end of a spring 23, the other end of which is connected to the beam member 1 at a point approximately midway between the pivot and the contacts 12, 13. The crank 18 is driven by a shaft from a variable speed gear-box 24 by an electric motor 25 hereinafter referred to as the "pen" motor, and as the crank 18 rotates it applies an oscillatory movement to the cord 19 which causes the carriage 21 to slide to and fro on the rod 22 and the spring 23 to alternately stretch and relax. This alternate stretching and relaxing causes the beam member 1 to oscillate between the contacts 12 and 13.

The carriage 21 supports an electrically-conductive stylus 26 and is adapted to traverse, as the carriage oscillates, an electrically-conductive roller 27. A sheet of electro-sensitive paper 28 is drawn over the roller 27 through a slot in the framework 4 from the roll of the paper mounted on a turntable 29 by means of a roller 30 and a pressure roller 31. The roller 30 is driven at a predetermined rate through a coupling 32 from a gear-box 33 and shaft 34 coupled to a further electric motor (not shown) which will be referred to hereinafter as the "chart" motor.

A locating cam 35 is positioned on the framework to locate the beam member 1 in a resting position as shown in FIGURE 1. The locating cam 35 consists of a cam body 35a pivoted on a pivot 35b to the framework and having a handle 35c by means of which the cam body 35a can be rotated. The cam is also coupled to electric starting switches 41 and 44 (as described later) so that rotation of the cam body 35a frees the beam member and closes the switches in the circuits for the pen and chart motors and in the electrical recording circuit.

The crank 18 is coupled to a cam 36 having a cam surface extending through 180 degrees, and a cam switch 37 is positioned to be operated by the cam. In FIGURE 1 the beam member 1, support 3, link 5, inextensible strip 6 and cam means, and spring 7, are all shown in section.

The electrical recording circuit and the circuit for operation of the pen and chart motors are shown in FIGURE 3. The pen motor 25 and chart motor 40 are connected in series with a starting switch 41 and in parallel with the primary winding 42 of a transformer 43. The starting switch operated by movement of the locating cam 35 is ganged with a further switch 44 in a stylus circuit comprising the secondary winding 45 of the transformer 43, the electrically-conductive roller 27, the stylus 26, and the anode and cathode of a triode valve 46, the grid of which is connected through a further circuit comprising a resistance 47, terminal 17, short metal rod 15, and contacts 12, 13, to an intermediate point on the secondary winding 45. Half-wave rectifiers 48, 49 are provided in opposite senses in each circuit and these are coupled with smoothing condensers 50, 51.

The transformer 43 is tapped so as to provide a negative voltage to the grid when the beam member 1 contacts either of contacts 12, 13 to prevent discharge through the triode valve 46.

A further stylus 52 is connected in parallel with the triode valve and stylus 26 in a time circuit having a switch 53 closed by a timing device at predetermined intervals to record the passage of time on the electro-sensitive paper 28. Each of the styli 26, 52 are provided with a resistance 54, 55 to control the current to the styli.

The cam switch 37 is connected in series with a cut-out switch 56 and both switches are connected in parallel with the contacts 12, 13 and the terminal 17 so that if desired, the cam switch 37 can be closed by means of the cam surface and the stylus 26 only records when the beam member 1 is moving in one direction.

When the switch 37 is closed by the cam surface and switch 56 is closed then current flows to the grid of the triode to prevent discharge through the stylus 26. The switch 37 remains closed while the beam member 1 is moving in one direction. While the beam member 1 is moving in the other direction with the switch 37 is open and no current flows to the grid thus allowing discharge through the stylus 26. Switch 56 allows the cam switch 37 to be isolated from the circuit and when switch 56 is open then no current flows to the grid when the beam member is not in contact with either of the contacts 12 and 13, i.e., the stylus 26 records when the beam member 1 is moving in both directions.

To commence operation of the device the locating cam 35 is rotated to free the beam and at the same time to close switches 41 and 44 to allow the "pen" and "chart" motors to operate. Rotation of the "pen" motor effects rotation of the crank 18 and causes the carriage 21 to traverse the rod 22 and to oscillate spring 23 through cord 19. The beam member 1 is drawn downwardly by spring 23 as it is stretched against the force exerted by spring 7 and is moved upwardly by spring 7 when spring 23 relaxes. When the short metal rod 15 is clear of the contacts 12, 13 the grid of the triode valve is biased so that a current passes through the stylus circuit and the stylus 26 marks the paper 28. When the beam member 1 abuts either of the contacts 12, 13 the further circuit is closed with the result that the grid potential is reduced below the threshold value of the valve so that the stylus circuit is opened and the stylus ceases to mark the paper. Similarly, when the cam switch 37 is closed by the cam 36, on the crank 18, the stylus 26 ceases to mark the paper except when the cut-out switch 56 is opened.

In the method of use, as described above, as the sample 11 of vulcanizable rubber composition is heated by means of the platens, the resistance to movement of the inextensible strip in the sample 11 increases as vulcanization proceeds. The force then applied by spring 23 to oscillate the beam member 1 between the contacts 12, 13 increases and a line of increased length is recorded by the stylus 26 on the electro-sensitive paper 28. A series of lines is recorded which increase in length to a maximum as the rubber composition becomes vulcanized.

Having now described our invention—
What we claim is:

A recording device for indicating the increase in resistance to shear of a rubber composition as it is vulcanized in a shear applying device comprising a beam member, a pivot on which said beam member is pivotally mounted adjacent one end, a first spring connected at one end to said beam member on one side of said pivot, a linkage connected at one end to said beam member on the other side of the pivot, a substantially inextensible strip connected to the other end of said linkage, a clamp for clamping a sample of rubber composition to said strip, heating means to heat said sample of rubber composition, a second spring connected to the inextensible strip to act in opposition to said first spring, and means to alternately stretch and relax said first spring to oscillate the beam member, said recording device comprising an electrically conductive support for electro-sensitive paper, an electro-conductive stylus mounted on a carriage connected to the other end of said first spring to traverse said paper with said spring, a pair of contacts to limit the amplitude of movement of said beam member, a triode valve, a source of electrical power connected to the cathode of said valve and to said electrically conductive support, an anode in said valve connected to said stylus and a grid connected to said source of electrical power to apply a polarity to said grid to prevent discharge through the valve when said beam member is in contact with either of said contacts.

References Cited in the file of this patent
UNITED STATES PATENTS

| 2,136,913 | Drain et al. | Nov. 15, 1938 |
| 2,647,033 | Faus | July 28, 1953 |